(12) United States Patent
Graefer et al.

(10) Patent No.: US 6,371,032 B1
(45) Date of Patent: Apr. 16, 2002

(54) TROLLEY WITH PASSIVE DISCHARGE MECHANISM

(75) Inventors: Dominik Graefer; Michele Vitalini, both of Nuremberg (DE); Richard Herrin, Argyle, TX (US)

(73) Assignee: Siemens ElectroCom, L.P., Arlington, TX (US)

( * ) Notice: Subject to any disclaimer, the term of this patent is extended or adjusted under 35 U.S.C. 154(b) by 0 days.

(21) Appl. No.: 09/541,153

(22) Filed: Mar. 31, 2000

Related U.S. Application Data

(63) Continuation-in-part of application No. 09/387,481, filed on Sep. 1, 1999.

(51) Int. Cl.[7] .............................................. B61B 13/04
(52) U.S. Cl. ..................................................... 105/141
(58) Field of Search ................................ 104/118, 119, 104/120; 105/141, 144, 145

(56) References Cited

U.S. PATENT DOCUMENTS

| | | | | |
|---|---|---|---|---|
| 5,018,928 A | * | 5/1991 | Hartlepp | 414/339 |
| 5,141,100 A | * | 8/1992 | Campus et al. | 198/795 |

* cited by examiner

Primary Examiner—S. Joseph Morano
Assistant Examiner—Robert J. McCarry, Jr.

(74) Attorney, Agent, or Firm—Edward Jorgensen; Philip G. Meyers Intellectual Property Law, P.C.

(57) ABSTRACT

A passive discharge mechanism for discharging articles from a trolley at selected locations is disclosed. The trolley may be equipped with on-board intelligence for communicating with an external controller, monitoring the trolley's location, and signaling actuation of a moveable member for engaging the passive discharge mechanism as the trolley reaches a selected destination for an article conveyed by the trolley. In one aspect the passive discharge mechanism comprises a transverse conveyor; in another aspect the passive discharge mechanism includes a tilt-type tray. A trolley for conveying articles along a monorail having arcuate portions includes a rigid frame having a longitudinal axis and opposed ends is also disclosed. A pair of rotatable yokes are coupled to the frame adjacent to the opposed ends of the frame for rotational movement around an axis perpendicular to the longitudinal axis as the trolley car travels along an arcuate portion of the monorail, each of the yokes having a pair of opposed arms extending from the mainframe, a pair of guide wheels mounted on each of the opposed arms for rotational contact with a guide surface of the monorail, and a load bearing wheel mounted adjacent to each of the opposed ends of the rigid frame, each of the load bearing wheels being rotatable around an axis perpendicular to the longitudinal axis for rotational movement around the axis as the trolley car travels along an arcuate portion of the monorail, the load bearing wheels extending through an uppermost portion of the rigid frame and contacting an upper load bearing surface of the monorail.

35 Claims, 12 Drawing Sheets

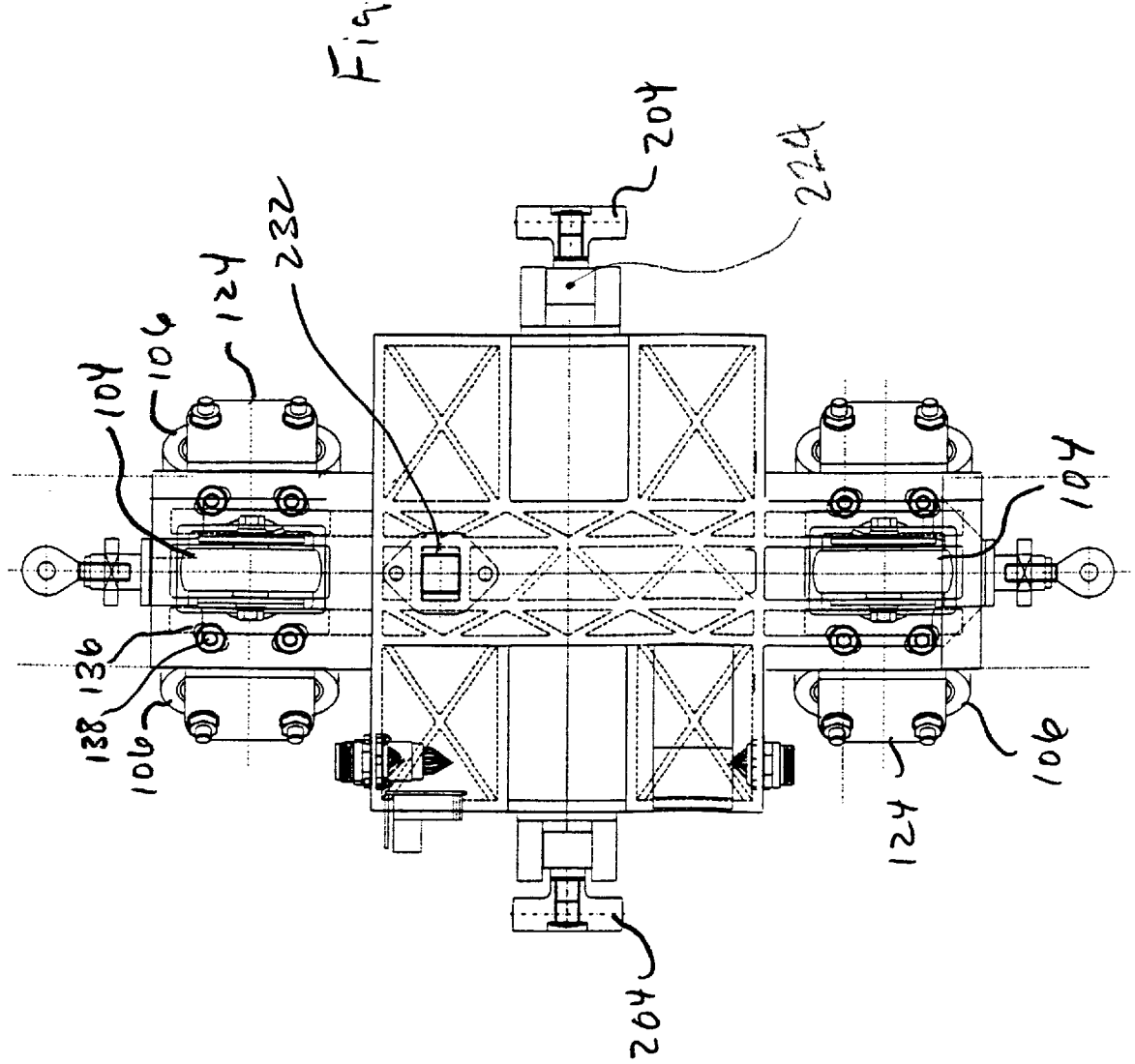

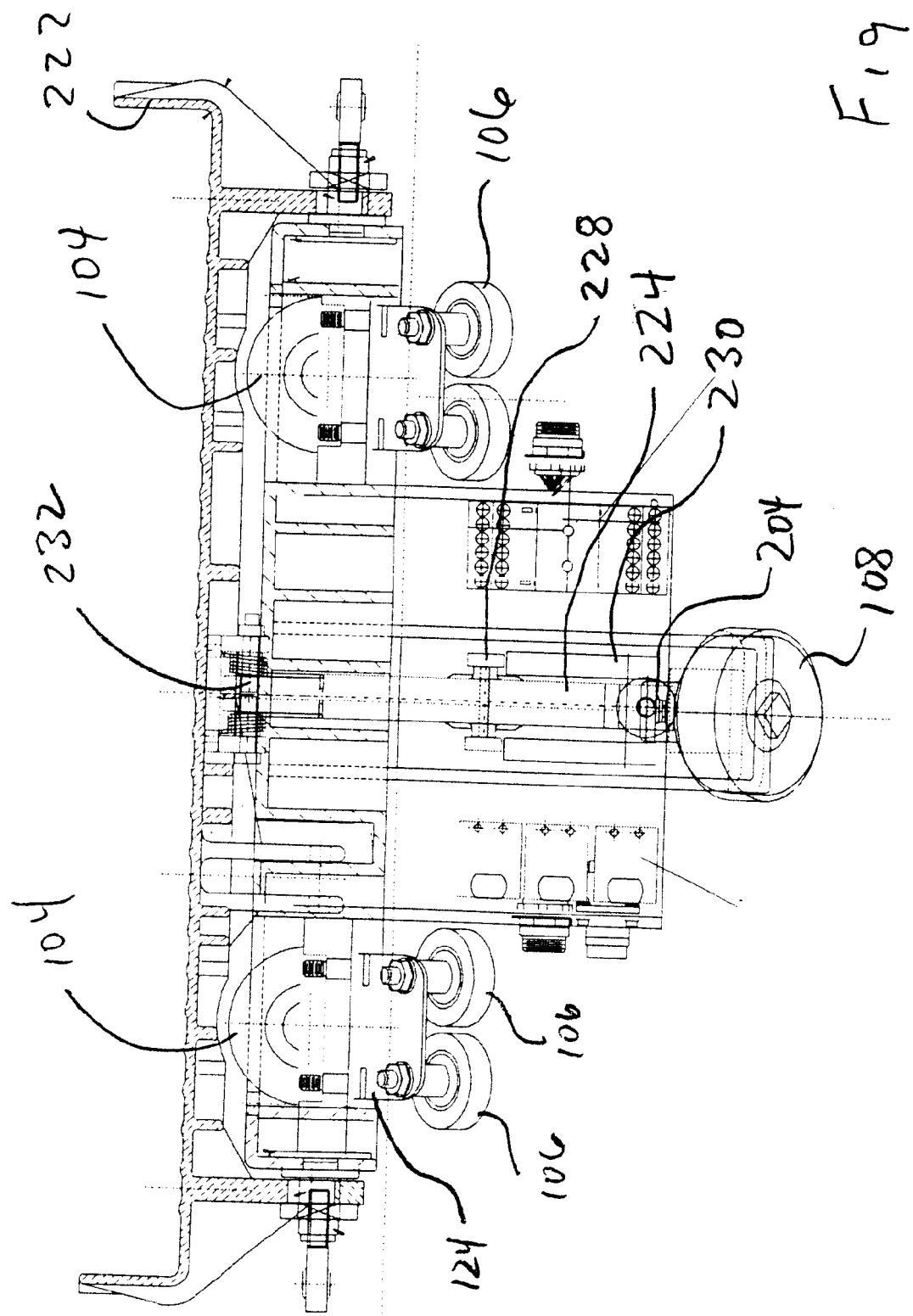

TROLLEY WITH PASSIVE DISCHARGE MECHANISM

RELATED APPLICATION

This application is a continuation-in-part of application Serial No. 09/387,481, filed Sep. 1, 1999 for a Trolley Chassis.

TECHNICAL FIELD OF THE INVENTION

The invention relates to an article conveying system utilizing a conveying train including a tug or locomotive and sequentially connected article conveying cars, the cars including a chassis and article tray. In particular, the invention relates to an improved chassis for the article conveying cars.

BACKGROUND OF THE INVENTION

Automated article conveying and sorting systems are widely used for receiving, transporting and discharging articles by and between receiving and discharge stations. Such systems are widely used for transporting and classifying articles in such operations as package shipment and delivery systems, warehouse storage and retrieval operations, and bulk postage handling operations.

In some applications, powered belt-type or roller conveyors are utilized for article transportation and sorting operations. Another type of article transportation and sorting system utilizes track mounted article conveying cars driven by a belt or chain which is powered by a stationary drive motor. Yet another system utilizes a conveying train including a powered tug or locomotive and sequentially connected article conveying cars for moving articles around a path including loading and discharge stations. In some cases the article conveying cars are equipped with tilting trays for receiving and discharging articles at various locations around the perimeter defined by the track. Mechanical or electromechanical devices such as cams, limit switches and location sensors may be utilized to control the tilting action of the trays during the transportation operation.

The operation of the article conveying train may be controlled by one or more microprocessors and a microprocessor may be employed to monitor and control the operation of the conveying train. Such a system may employ a stationary microprocessor and a mobile microprocessor mounted on the tug or locomotive with appropriate communication devices as well as various sensors, actuators and control devices for monitoring and controlling the operation of the system. One such system is disclosed in U.S. Pat. No. 5,632,589, titled "Apparatus for Centralized Mechanical and Systems Control in a Material Handling System," issued May 27, 1997, and assigned to Symorex, Inc. Another such system is disclosed in U.S. Pat. No. 5,662,045, titled "Locomotive for Material Handling Train," issued Sep. 2, 1997, and assigned to Symorex, Ltd., while another such system entitled "Track for Sortation Handling Equipment" is disclosed in U.S. Pat. No. 5,555,814, issued Sep. 7, 1996, and assigned to Symorex, Inc. A train and track with a locomotive including a microprocessor for keeping track of position, regulating speed and controlling dumping is disclosed in U.S. Pat. No. 5,018,929 to Hartlepp, issued May 28, 1991. The disclosures of U.S. Pat. Nos. 5,632,589; 5,662,045; 5,555,814 and 5,018,928 are incorporated herein by reference for all purposes.

In an article sorting system utilizing a powered tug or locomotive to pull consecutively coupled article conveying cars, a monorail track is often used. In order to traverse a continuous path between loading and discharge stations, the track must incorporate arcuate sections. Additionally, depending upon the particular control system used, the speed of the conveying train must be closely controlled in order to effect the proper sequencing of loading and unloading articles. For example, if the unloading sequence is keyed or triggered by the expected location of the train or a particular article conveying car at a given time, the failure of the train to be in the proper position at the designated time may result in overloading or mis-loading a car, damaged articles or packages, clogged or jammed auxiliary chutes or conveyors and system downtime. Thus, close control of the article conveying train's speed can be a critical factor in the operation of such a system.

The cars utilized in a tug or locomotive powered train in an article conveying system as described above typically employ at least two sets of wheels for traversing the monorail track. The two sets of wheels are normally located adjacent to opposing ends of the car. Outrigger and guide wheels may also guide and stabilize the car as it traverses the monorail. In order to provide the necessary stability to the car, especially if the car is equipped with a tilting tray for discharging articles, the car must maintain a fixed position relative to the monorail track. Usually the wheels of the car are depended upon to maintain the car in the proper position relative to the track. However, if the wheels are fixed in position relative to the track and the tilting tray mechanism carried by the car, additional frictional forces will be generated between the wheels and the track as the car traverses arcuate portions of the track. The additional frictional forces generated as a plurality of such cars are pulled through an arcuate section of track will tend to slow the train, thereby interfering with operation of the conveying and sorting system. The extent of the frictional forces will depend upon the relative spacing of the car wheels along the car chassis, the radius of curvature of the arcuate track section, the type of wheels used and other factors. The problem is accentuated when a monorail track is used due to the close tolerances between the car wheels and rail required to give the car the required stability. Although the problem may be alleviated through the use of a segmented, articulated car chassis permitting independent movement of the different sections of the car, such cars are more complicated and expensive to produce and maintain and present additional problems. Additionally, article conveying cars with segmented chassis may not be suited for use in certain applications where the rigidity of conventional chassis is required.

Other problems and concerns associated with the prior art article conveying mechanisms involve the discharge mechanism used to discharge articles at various locations around the perimeter defined by the track. Such mechanisms have tended to be complex and not as reliable as desired. For example, a cross-belt sorter including an endless loop of linked wheeled chassis members which include hub-mounted generators attached to at least one of the wheels of each chassis member is disclosed in U.S. Pat. No. 5,690,209 to Kofoed, issued Nov. 27, 1997. Kofoed's carriers are preferably cross-belt units driven by on-board a.c. motors and each carrier is equipped with circuitry for controlling the motor. Additionally, a battery is provided on each carrier.

SUMMARY OF THE INVENTION

In one embodiment, the invention comprises a passive discharge apparatus adapted for mounting on a trolley for transporting articles along the path of a track, the apparatus being adapted to receive and discharge articles at a selected location. In one aspect, the passive discharge mechanism includes a conveyor, mounted for movement in a direction transverse to the track and an arm coupled to the conveyor for engaging a moveable member positioned adjacent to the track. A flexible connector is used to couple the arm to the conveyor, the connector translating movement of the arm upon engagement of the member into transverse movement of the conveyor for discharging articles carried by the apparatus without the need for a powered drive unit for the conveyor. In another aspect, the passive discharge mechanism comprises a titling tray discharge apparatus.

In either aspect, the passive discharge mechanism may engage a moveable member mounted adjacent to the rail on which the trolley operates. In this case the trolley is provided with on-board intelligence, i.e., a microprocessor. Thus, the member may be actuated by a signal from the on-board microprocessor carried by the trolley that communicates with an external controller. The external controller communicates the destination of an article as the article is loaded on the trolley, and the microprocessor utilizes sensing devices to determine when it is approaching the selected destination. The on-board microprocessor then generates a signal, actuating the movable member to engage the passive discharge apparatus, discharging the article.

The present invention also provides an improved truck for supporting a car on a rail structure, such as a trolley car forming part of a conveyor system. Such a truck includes a carriage, a yoke connected to the carriage by a rotatable support, such that the yoke can rotate in a horizontal plane relative to the carriage, a plurality of guide wheels, fixtures that mount each wheel to the yoke optionally at horizontally offset positions with predetermined spacing to conform to the rail structure, such that rotation of the yoke relative to the carriage causes the wheels to move in unison to conform to a curve in the rail structure. An articulated yoke of the invention is specially adapted for supporting one or more wheels on opposite sides of a monorail. A conventional material carrying device may be mounted on the carriage. Such a material carrying device may be as simple as a horizontal platform, or more elaborate, such as a tilt-tray or transverse belt discharge mechanism. The fixtures that mount the wheels to the yoke are preferably not mounted on casters, i.e., rotatable axles. Instead, such wheels are mounted to the yoke using a fixture that does not substantially swivel. However, the yoke uniting the wheels is mounted to the carriage in such a manner that the yoke and wheels can swivel in unison relative to the carriage about a "virtual axle" which may be offset from the actual vertical axes of the individual wheels. Such an arrangement, particularly when a pair of yokes are mounted at front and rear portions of the carriage, provides a rail-borne car which moves smoothly around curves yet is securely mounted in its associated rail or rails.

In one embodiment, a trolley car for conveying articles along a monorail having arcuate portions includes a rigid frame having a longitudinal axis and opposed ends. A pair of rotatable yokes are each coupled to the frame adjacent to the opposed ends of the frame for rotational movement around an axis perpendicular to the longitudinal axis as the trolley car travels along an arcuate portion of the monorail. Each of the yokes has a pair of opposed arms extending from the mainframe and a pair of guide wheels are mounted on each of the opposed arms for rotational contact with a guide surface of the monorail. The trolley car also includes a load bearing wheel mounted adjacent to each of the opposed ends of the rigid frame. Each of the load bearing wheels is moveable around an axis perpendicular to the longitudinal axis for rotational movement around the axis as the trolley car travels along an arcuate portion of the monorail. The load bearing wheels are mounted on an uppermost portion of the frame, extend through the frame and contact an upper load bearing surface of the monorail.

In another embodiment, a chassis for a supporting a trolley car along a monorail has a central vertical axis includes a rigid frame having a longitudinal axis. The frame includes a plurality of openings arranged around an axis perpendicular to the longitudinal axis of the chassis frame.

At least one rotatable yoke including opposing arms extending from the frame is coupled to the frame for rotational movement around the perpendicular axis as the chassis travels along an arcuate portion of a monorail. A plurality of couplers such as bolts, screws or rivets extend through the openings retaining the yoke for rotation around the perpendicular axis. The chassis also includes at least one rail guide wheel mounted on each of the opposing arms for guiding the chassis during movement along the monorail and at least one load bearing wheel coupled to the frame for rotation along a top surface of the monorail. The load bearing wheel supports the chassis as the trolley car moves along the monorail. At least one stabilizing outrigger wheel is coupled to the frame in order to stabilize the frame against swaying or rotational movement around the longitudinal axis of the chassis during movement along the rail.

In another embodiment, a truck for supporting a trolley car along a monorail having a central vertical axis includes a centrally positioned load bearing wheel. The load bearing wheel contacts and rotates along an upper surface of the rail to support the trolley car. The truck also includes a yoke mounted for rotation around a central vertical axis of the rail with opposing outwardly inclined arms. At least one guide wheel is mounted on each of the inclined arms for rotating along an upper inclined guide surface of the rail. The truck includes a support plate for supporting the yoke and a plurality of fasteners coupling the yoke and support plate for movement relative to the support plate. Outrigger wheels are also provided for minimizing or eliminating any sway as the car moves along the rail.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 12 is a partial top perspective of the discharge mechanism of FIG. 11; and

FIG. 13 is a partial side perspective of the discharge mechanism of FIG. 11.

DETAILED DESCRIPTION

Figure 1:
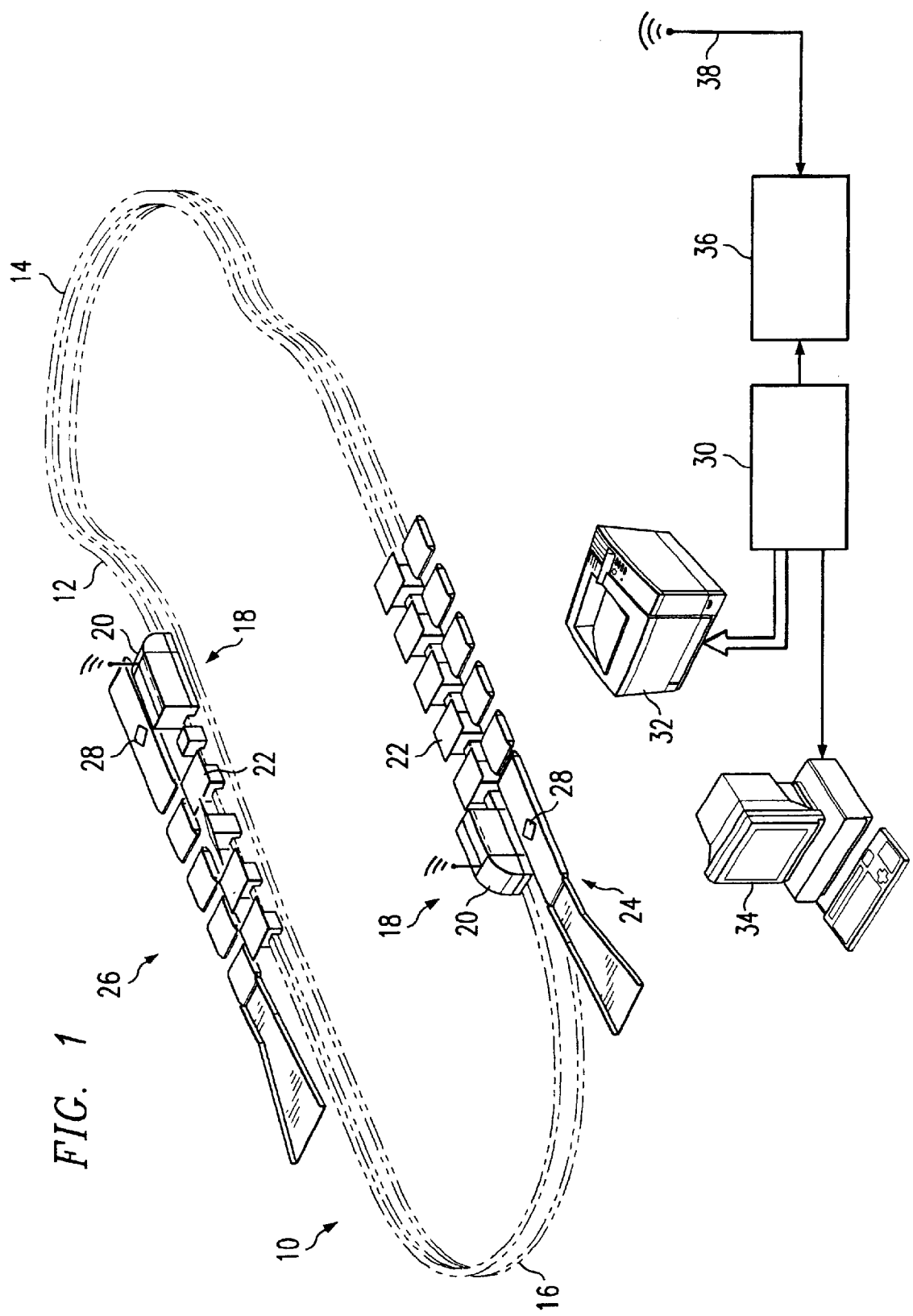
FIG. 1 is a schematic overview of a system utilizing the trolley car of the invention.

Referring now to FIG. 1, an article conveying and sorting system 10 is schematically illustrated. The system 10 includes an elongate continuous monorail track 12 with arcuate sections generally designated 14 and 16. Article conveying trains 18 include a tug or locomotive 20 and a plurality of passive cross-belt or tilt-type article conveying or trolley cars 22. Discreet articles 28, such as bundled letters, packages and the like, are loaded onto conveying cars 22 at loading station 24 and received at unloading station 26. It will be understood that in many systems a plurality of loading and unloading stations 24, 26, and trains 18 will operate in a continuous manner to transport and sort articles. Each of the tugs 20 is equipped with an RF frequency receiver/transmitter (not shown). An intermediate microprocessor 30 communicates with an input terminal 34, a printer 32 and a train control microprocessor 36. Control microprocessor 36 transmits control signals via RF receiver/transmitter 38 to tugs 20 to control the operation of the sorting and conveying system 10.

As will be appreciated, due to the nature of the article conveying and sorting system 10, trolley cars 22 must negotiate arcuate sections 14 and 16 of the track without binding or dragging. In order to facilitate loading, unloading and conveying operations, the trolley cars 22 must also be stable, i.e., must travel along the track with a minimum of swaying, while closely following the orientation of the track, especially at the loading and unloading stations 24 and 26.

Figure 2:
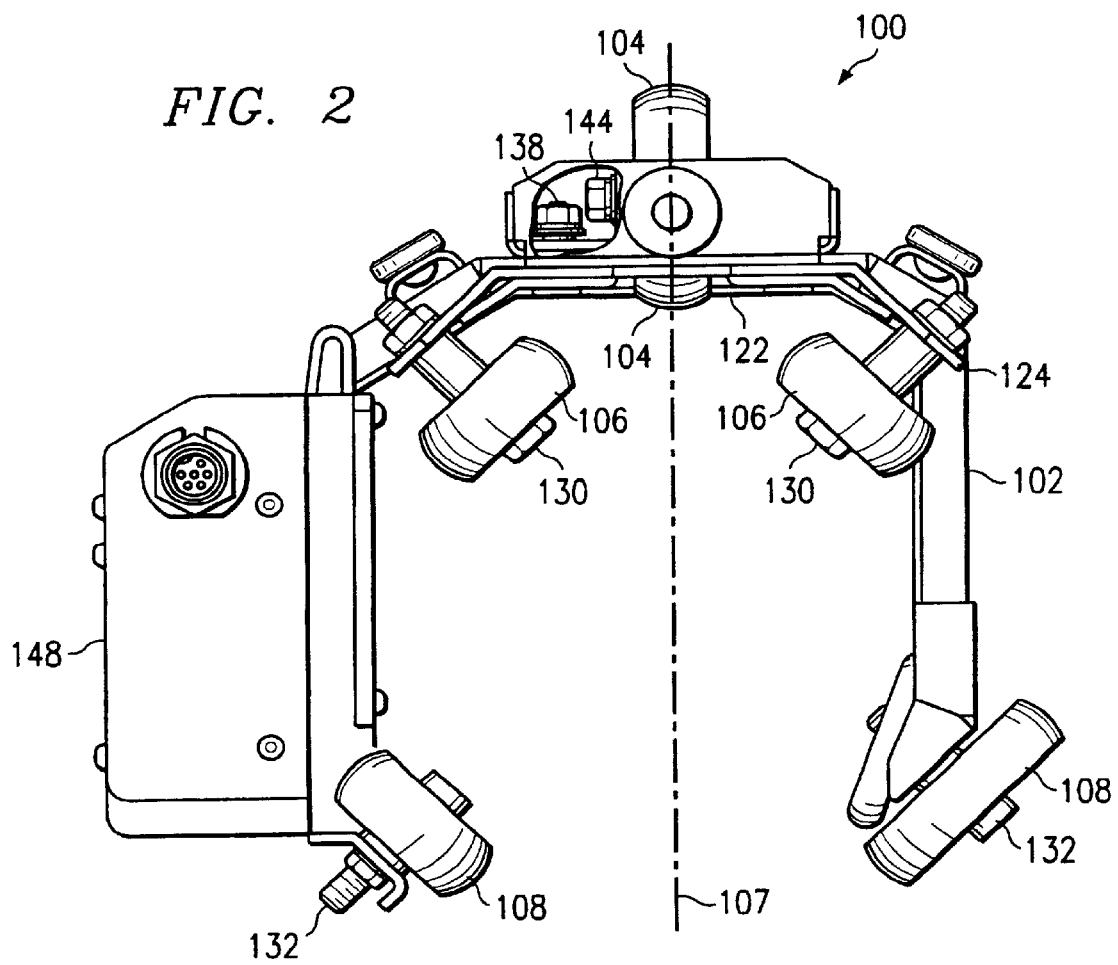
FIG. 2 is an end view of the chassis of the invention.
Figure 3:
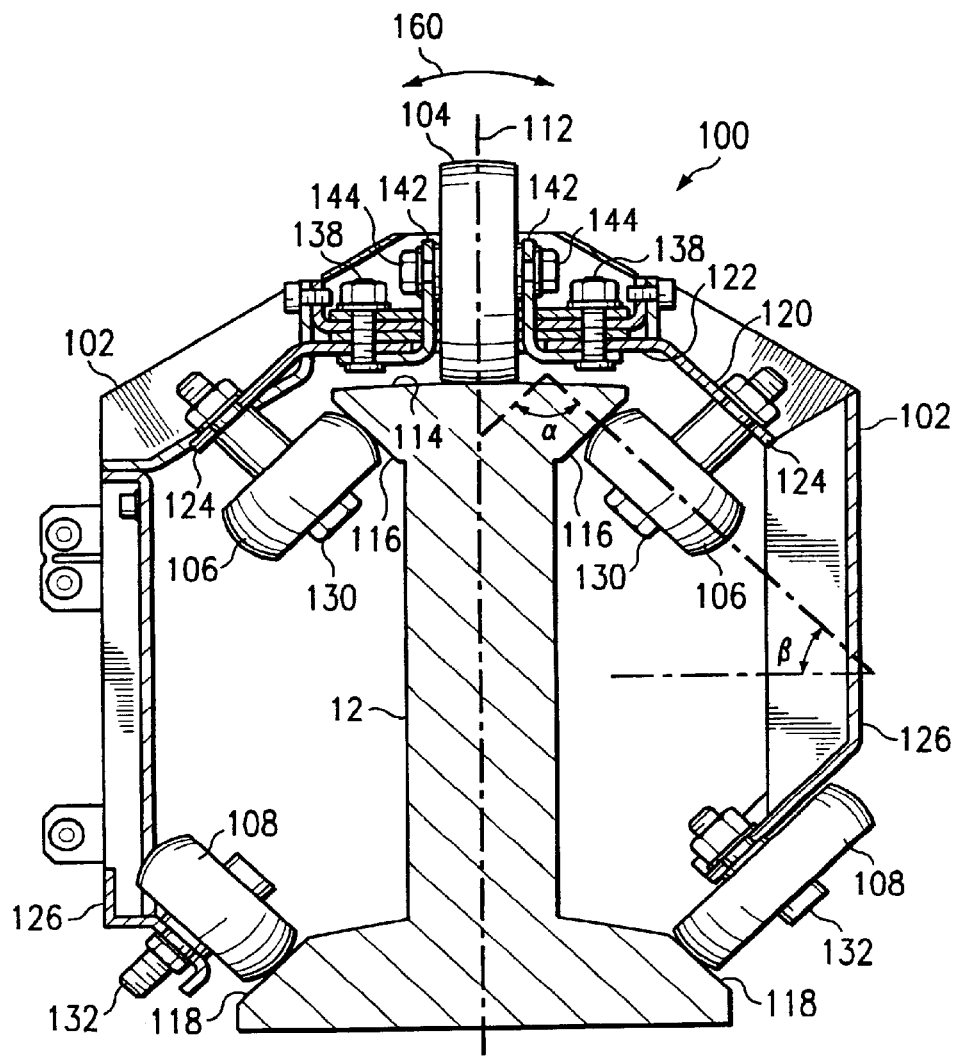
FIG. 3 is a cross-sectional view of the chassis of the invention.
Figure 4:
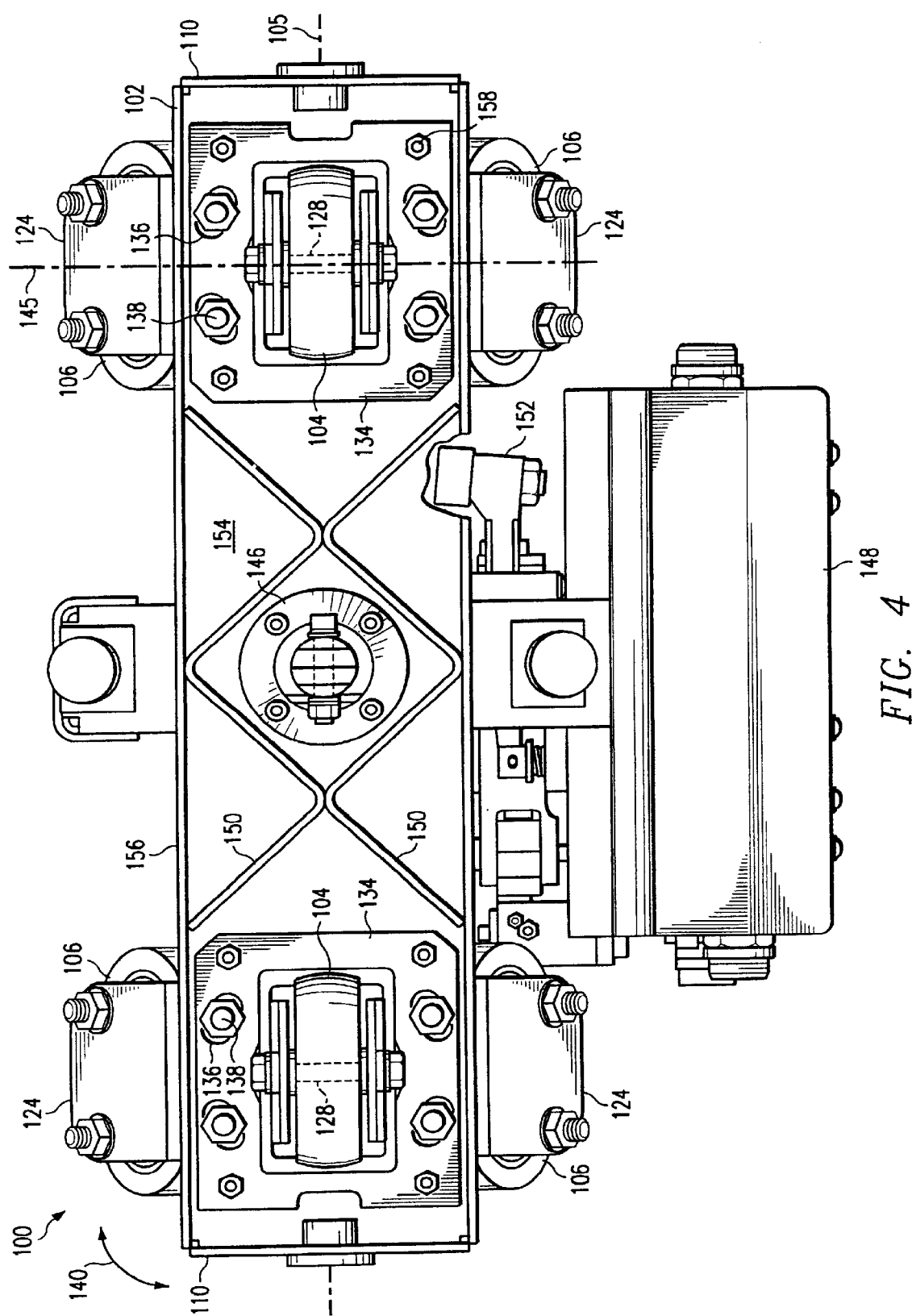
FIG. 4 is a top perspective view of the chassis of the invention.
Figure 6:
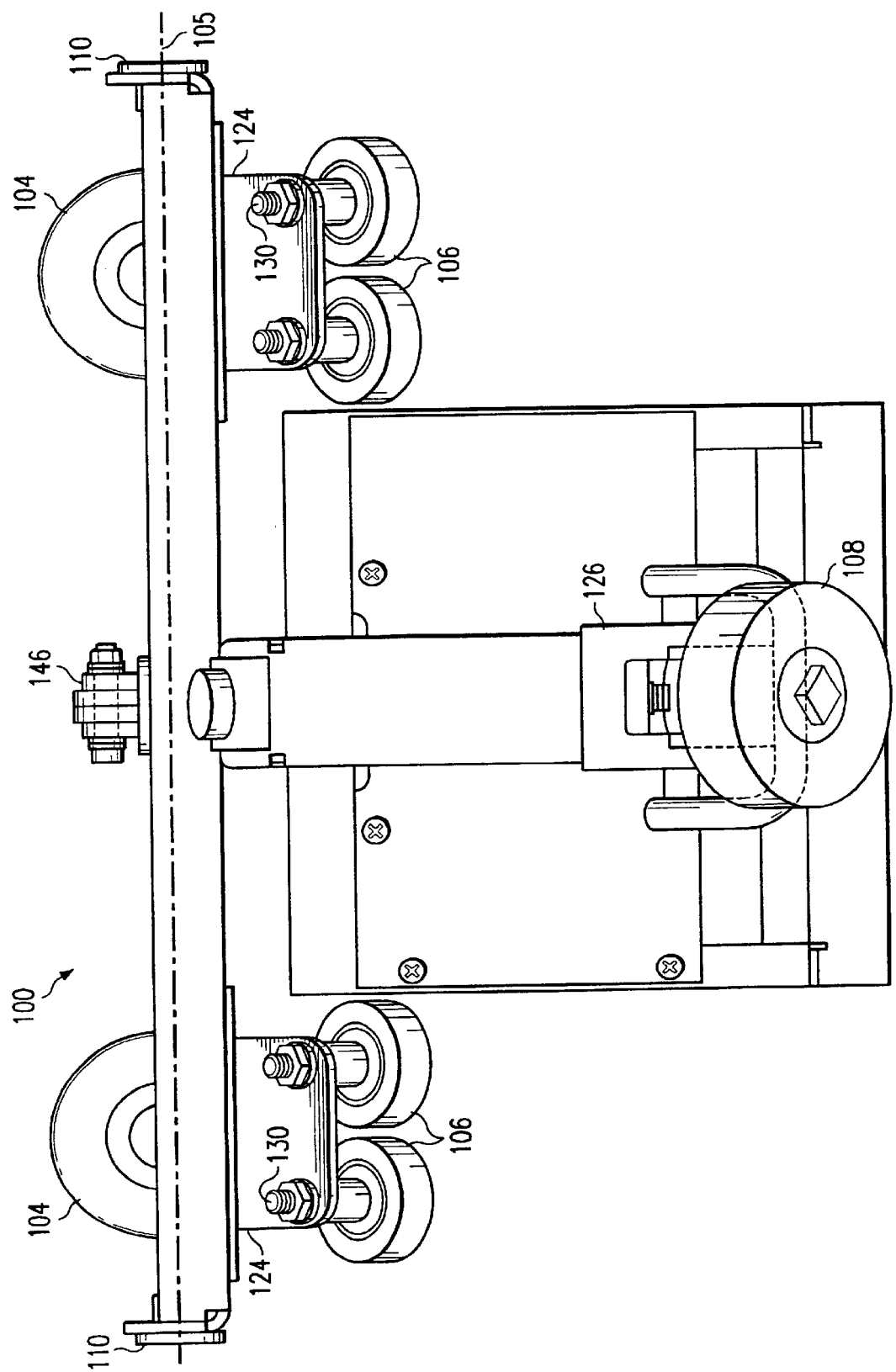
FIG. 6 is a partial side view of the chassis of the invention.

Referring now to FIGS. 2–4 the trolley car chassis 100 of the present invention is illustrated. As best illustrated in FIG. 3, monorail track 12 comprises an elongated, generally "I" shaped member with an upper bearing surface 114, inwardly inclined guide surfaces 116 and lower inclined outrigger surfaces 118. The chassis 100 has a longitudinal axis 105 and a vertical axis 107. As illustrated, the chassis 100 includes two yokes 120 mounted adjacent to opposing ends 110 of the chassis 100. Each of the yokes 120 includes a horizontal center section 122 and a pair of opposed, outwardly extending, inclined arms 124.

As shown in FIGS. 2 and three, the chassis 100 includes a rigid, generally "C" shaped frame 102 adapted to conform to track 12. The "C" shaped frame 102 may be formed from any suitable material such as steel, plastic, fiberglass or combinations thereof. For example, "C" shaped frame 102 could be assembled from individually formed components such as stamped steel components or integrally formed from an appropriate plastic by injection molding or a similar process. "C" shaped frame 102 may also be molded from fiberglass using conventional techniques.

The chassis 100 includes at least one load-bearing wheel 104 and, as illustrated, a pair of load-bearing wheels 104. The load-bearing wheels 104 are centrally mounted in the uppermost portion of frame 102, adjacent to opposing ends 110 (FIG. 4) of chassis 100. Each of the load bearing wheels 104 is rotatable mounted on a load bearing axle 128. Each load bearing axle 128 is mounted upon and between a pair of supports or flanges 142 which are coupled to yoke 120 by fasteners 138. As illustrated, fasteners 138 are bolts, however, but any suitable fastener such as rivets, screws or pins may be used. While support flanges 142 are shown as separate components, it will be understood that the flanges 142 may be integrally formed with yoke 120 or may each be formed from individual components or integrally with frame 102. Also, as illustrated, support flanges 142 have a generally "L" shaped cross-section, however, other geometries may be selected so long as the supports 142 support the load bearing wheel 104 in the desired fashion.

Figure 5:
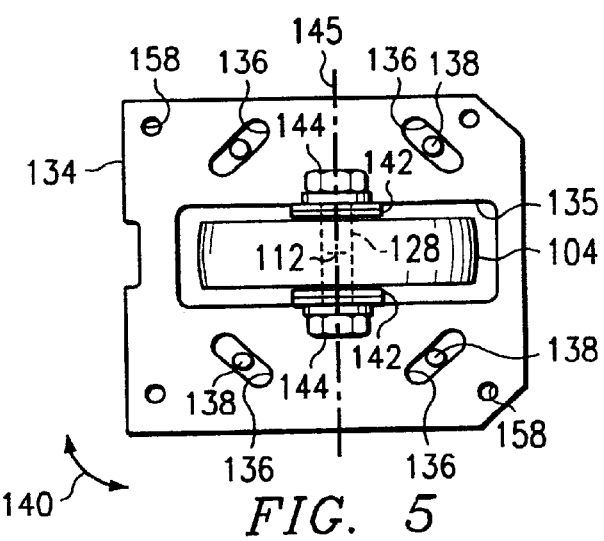
FIG. 5 is a fragmentary top view of the chassis of the invention.

As shown in FIGS. 3 and 5, the load bearing wheels 104 are aligned with vertical axis 112 of track 12. Axis 112 defines a central vertical axis of monorail track 12 and of load bearing wheel 104. As will be appreciated, load bearing wheels 104 rotate along the upper bearing surface 114 of the rail 12 and carry the weight of the trolley car as it travels along track 12. Load bearing wheels 104 may be formed from any appropriate material; in one embodiment, load bearing wheels 104 are formed from a relatively hard plastic or rubber.

Referring now to FIGS. 2–6, chassis 100 includes at least one guide wheel 106 coupled to each of opposed arms 124 of yoke 120. As illustrated, four pairs of guide wheels 106 are provided. Each pair of guide wheels 106 is positioned on an opposed 124 arm adjacent to opposing ends 110 of the chassis. A guide axle 130 is provided for mounting each of guide wheels 106 on an opposed arm 124 of yoke 120. As will be appreciated, guide axles 130 form a non-swiveling fixture, relative to opposed arms 124, for mounting guide wheels 106. Guide wheels 106 are upwardly and inwardly inclined at an angle $\alpha$ of between about 80° and 100° and preferably at an angle of 90° relative to guide surface 116 of track 12 which corresponds to an angle $\beta$ of approximately 45° relative to vertical axis 112.

As illustrated, a pair of guide wheels 106 are mounted in opposing relationship on each of the outwardly inclined opposed arms 124 of yokes 120. In operation, each pair of guide wheels 106 contact rail guide surfaces 116 as the trolley car 22 travels along monorail track 12 to maintain alignment of the chassis 100 with the rail 12.

Frame 102 also includes a pair of lower, inwardly extending, outrigger wheel support arms 126. Outrigger wheels 108 are rotatably mounted on outrigger axles 132 and support arms 126 for contact with outrigger surface 118 of monorail 12. In operation, outrigger wheels 108 provide additional stabilization for chassis 100 as trolley car 22 travels along track 12. Outrigger wheels 108 serve to minimize sway or rotation of the chassis 100 in the direction shown by arrow 160 of FIG. 3 as the trolley car 22 travels along rail 12. Outrigger wheels 108 serve to stabilize trolley car 22 against rotational movement or swaying in the direction generally illustrated by arrow 160. Guide wheels 106 and outrigger wheels 108 may be formed from any appropriate material; in one embodiment, guide wheels 106 and outrigger wheels 108 are formed from a relatively hard plastic or rubber.

As best illustrated in FIGS. 4 and 5, the top of frame 102 includes a relatively flat longitudinally extending member 154 with sides 156 extending upwardly from member 154. Member 154 is aligned with longitudinal axis 105 of frame 102. A pair of "W" shaped ribs or stiffeners 150 extend across member 154 to provide the structure with increased rigidity. A tray mounting assembly 146 is secured to and extends upwardly from the member for attachment of a conveying tray (not shown). At least one support plate 134 is mounted on top of member 154. As shown, a pair of generally rectangular support plates 134 are positioned on top of member 154 adjacent to opposing ends 110 of the chassis 100. As illustrated, plates 134 are rigidly attached to member 154 with rivets 158. Alternatively, plates 134 may be secured to member 154 with any other suitable fastening means, such as bolts, screws or with an appropriate adhesive. Member 154 together with plate 134 form a carriage 133. As shown, load bearing wheel 104 extends partially through yoke 120 and rectangular opening 135 centrally located in support plate 134 and rotates around a horizontal axis 145 substantially perpendicular to vertical axis 112.

Referring now to FIG. 5, support plates 134 each include a plurality of apertures, such as slots 136 arranged in a generally circumferential pattern around the center of support plate 134 and axis 112. As will be appreciated, apertures 136 allow a corresponding yoke 120 to rotate a limited distance in a horizontal plane perpendicular to central vertical axis 112 as generally indicated by arrow 140. Although the apertures 136 are shown as elongated rectangles with curved ends, other geometries may be selected so long as openings 136 serve their purpose as described below. In any case, the apertures 136 are of sufficient size to allow limited horizontal movement of couplers 138 within the apertures 136.

As shown in FIGS. 4 and 5, extending through apertures 136 are fasteners or couplers 138 which also extend through yoke 120 and support 142. Fasteners 138 loosely couple yoke 120, support flanges 142 and plate 134 together. As used herein, the term "loosely" means that fasteners or couplers 138 are able to move within apertures 136 thereby allowing yoke 120, support flanges 142 and load bearing wheel 104 to rotate relative to axis 112 as indicated by arrow 140 during normal operation. Further, the term "loosely coupled" encompasses sufficient freedom of movement so as to allow yoke 120 to move a limited distance in a vertical direction. Thus, load bearing wheel 104 along with support flanges 142, guide wheels 106 and yoke 120 form an articulating, five-wheeled truck 164 (FIG. 7(a)) for supporting an end 110 of chassis 100 of trolley car 22 as the car moves along monorail track 12. Two such five wheeled trucks support carriage 133 at opposing ends. It will be appreciated by allowing rotational movement of the truck 164 about axis 112, the trolley car 22 may negotiate curves or arcuate sections 14 and 16 of rail 12 while simultaneously maintaining a stable, tight coupling to the rail.

Figure 7C:
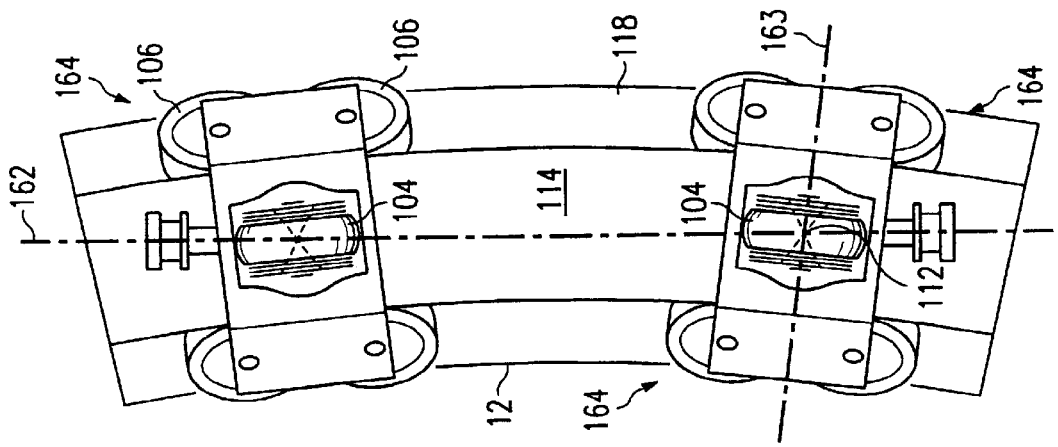
FIGS. 7(a)–(c) are partial schematic views showing the orientation of the trucks of the chassis of the invention aligned with different rail sections.
Figure 7B:
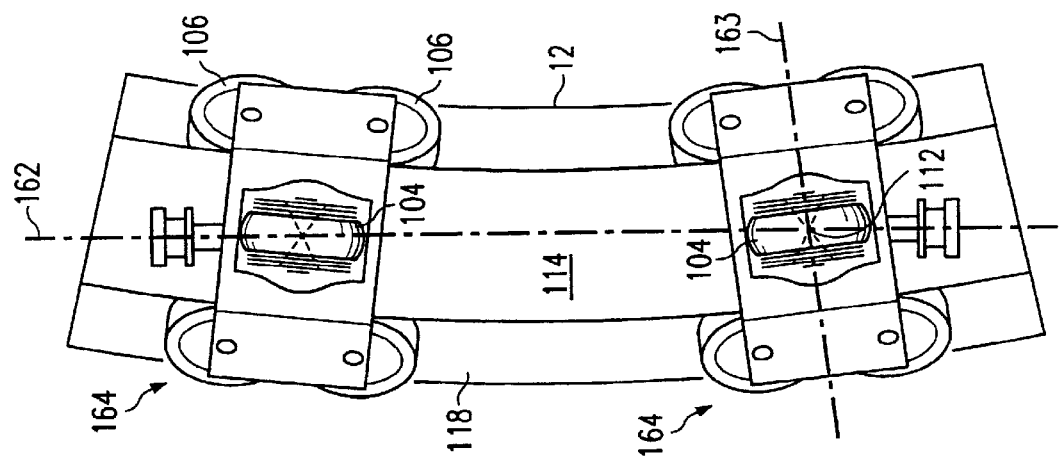
Figure 7A:
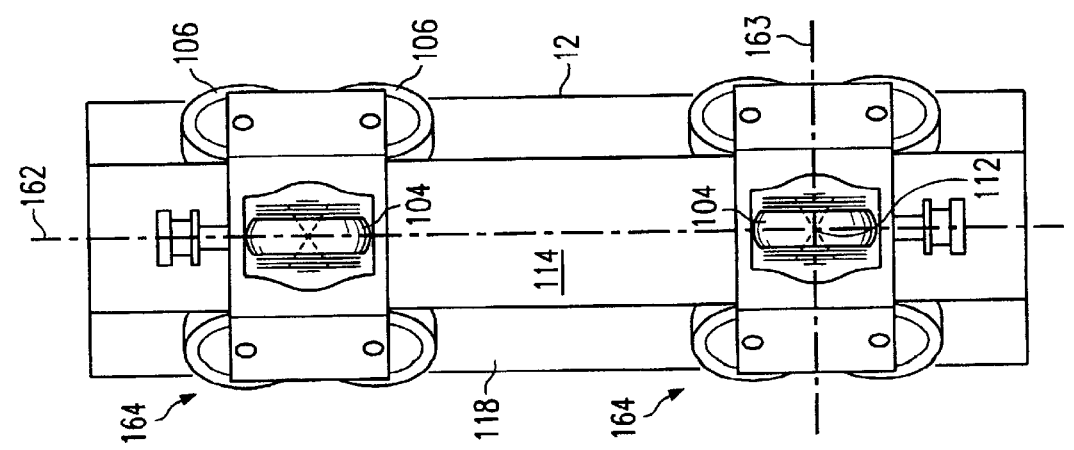

With reference to FIGS. 7(a)–7(c), the operation of the chassis 100 of the invention may be further appreciated. As shown in FIG. 7(a), the trolley chassis 100 is shown positioned on a straight section of track 12. The trucks 164 are positioned so that all four pairs of guide wheels 106 are parallel to each other. Referring now to FIGS. 7(b) and 7(c), the chassis is illustrated traversing an arcuate section of track such as designated 14 and 16 in FIG. 1. In each case, each of the trucks 164 rotate relative to vertical axes 112 thereby allowing guide wheels 106 to conform to the arcuate contour of the track 12 as the trolley car 22 travels through the curved section of track. As will be appreciated, this allows the trolley car 22 to travel through arcuate sections of track without binding or dragging guide wheels 106 due to torque applied perpendicular to the longitudinal axis 162 of the chassis 100. Further, since yoke 120, support flanges 142 and plate 134 are loosely coupled together, the yoke 120 may rotate sightly around an axis 163 perpendicular to axis 112 while simultaneously moving a limited distance in a vertical direction, thereby allowing the trolley car 22 to traverse an arcuate incline without applying excessive torque to the chassis 100.

The unique geometry of truck 164, with centrally mounted load bearing wheels 104, provides for a low-profile chassis upon which to mount a tray. This in turn reduces the overhead clearance required above the track 12, minimizing space requirements. The geometry of truck 164, in conjunction with guide wheels 106 and outrigger wheels 108, also compensates for minor track defects and orientations which might otherwise interfere with normal operations. As will be appreciated, the central location of outrigger wheels 108 relative to trucks 164 provides needed lateral stabilization without requiring rotational freedom of the outrigger support arms 126.

Figure 8:
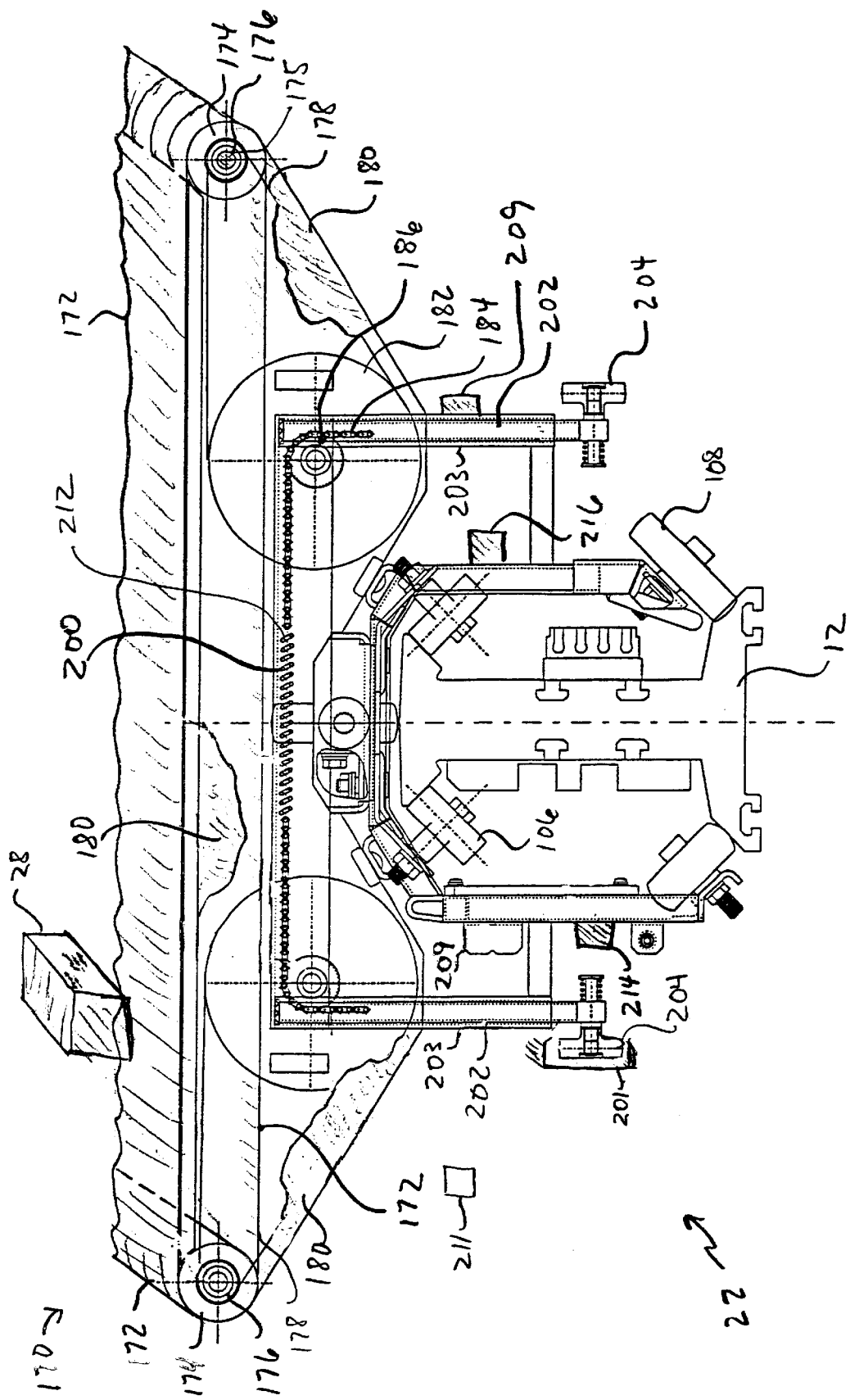
FIG. 8 is a partial cross-section view of a transverse conveyor-type discharge apparatus of the invention.
Figure 9:
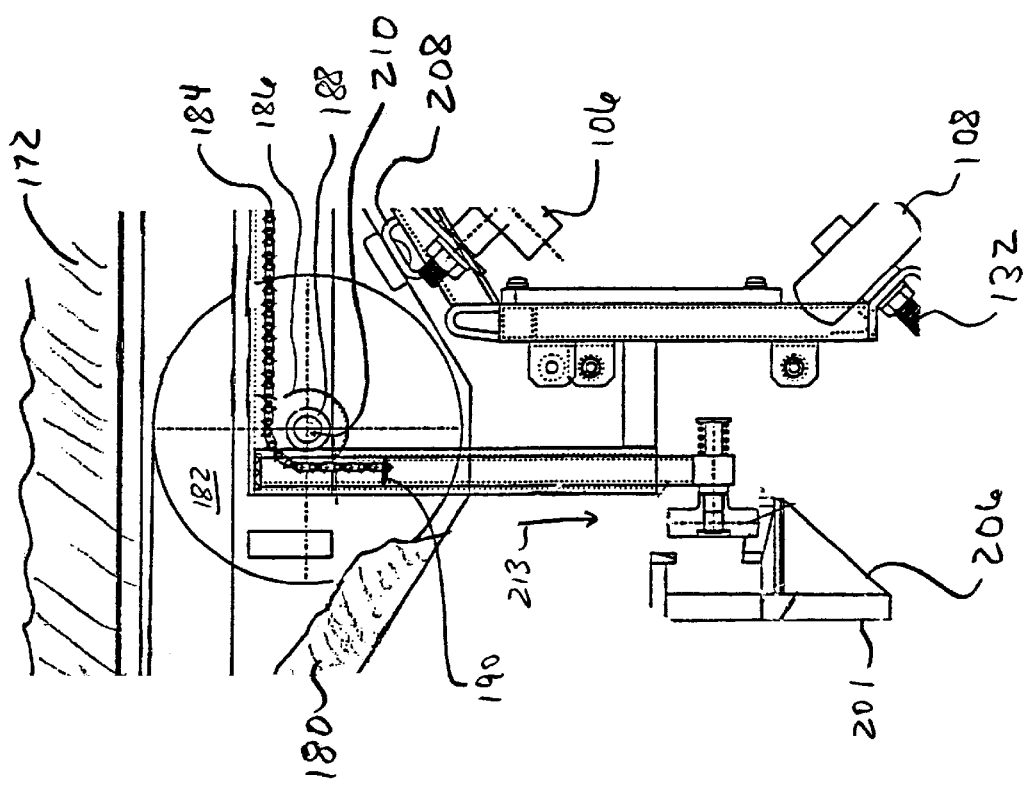
FIG. 9 is a partial exploded view of the transverse conveyor-type discharge apparatus of FIG. 8.

Referring now to FIGS. 8 and 9, there is illustrated a transverse conveyor apparatus 170 suitable for mounting on chassis 10 and transporting articles 28 along the path defined by track 12 for discharge at selected locations. As explained in detail below when the activation roller 204 engages an actuated moveable member or ramp 206 in guide rail 201, a sliding arm 202, mounted in a fixed housing 203, drives conveyor 172 to discharge an article 28 positioned on the conveyor. This passive, externally actuated system eliminates the need for separate drive unit, such as an electric motor mounted on the trolley, for operating the conveyor.

As the trolley 22 (FIG. 1) approaches a selected discharge point, such as an unloading station 24, a moveable active ramp 206 corresponding to the location is moved into position to engage activation roller 204. The moveable ramp 206 may be actuated by the train control microprocessor 36 based upon the location of the train 18 or by an onboard microprocessor (not shown) mounted on the train or trolley. In either case, the destination of the article conveyed by the trolley will be stored in microprocessor. Photocells, light sources, proximity switches, RF receiver/transmitters, bar code readers and similar devices may be utilized in conjunction with an onboard microprocessor and/or the train control microprocessor 36 to establish the trolley's location on the track 12 and generate a signal for the moveable ramp to change position as the trolley approaches the destination corresponding to the article 28 conveyed on the trolley.

In a preferred embodiment, the trolley 22 of FIGS. 8 and 9 is provided with on-board intelligence in the form of a microprocessor 214. The microprocessor is coupled to an on-board RF receiver and/or receiver/transmitter 216 that receives signals from train control microprocessor 36 via RF receiver/transmitter 38. The train controller 36 signals the on-board microprocessor with the destination of articles loaded onto the trolley 22. The on-board microprocessor 214 utilizes a photocell, bar code scanner or similar device (not shown) to monitor its location on the track. Thus, the trolley is able to determine when it is approaching the destination of the article or articles that it is conveying.

Figure 10:
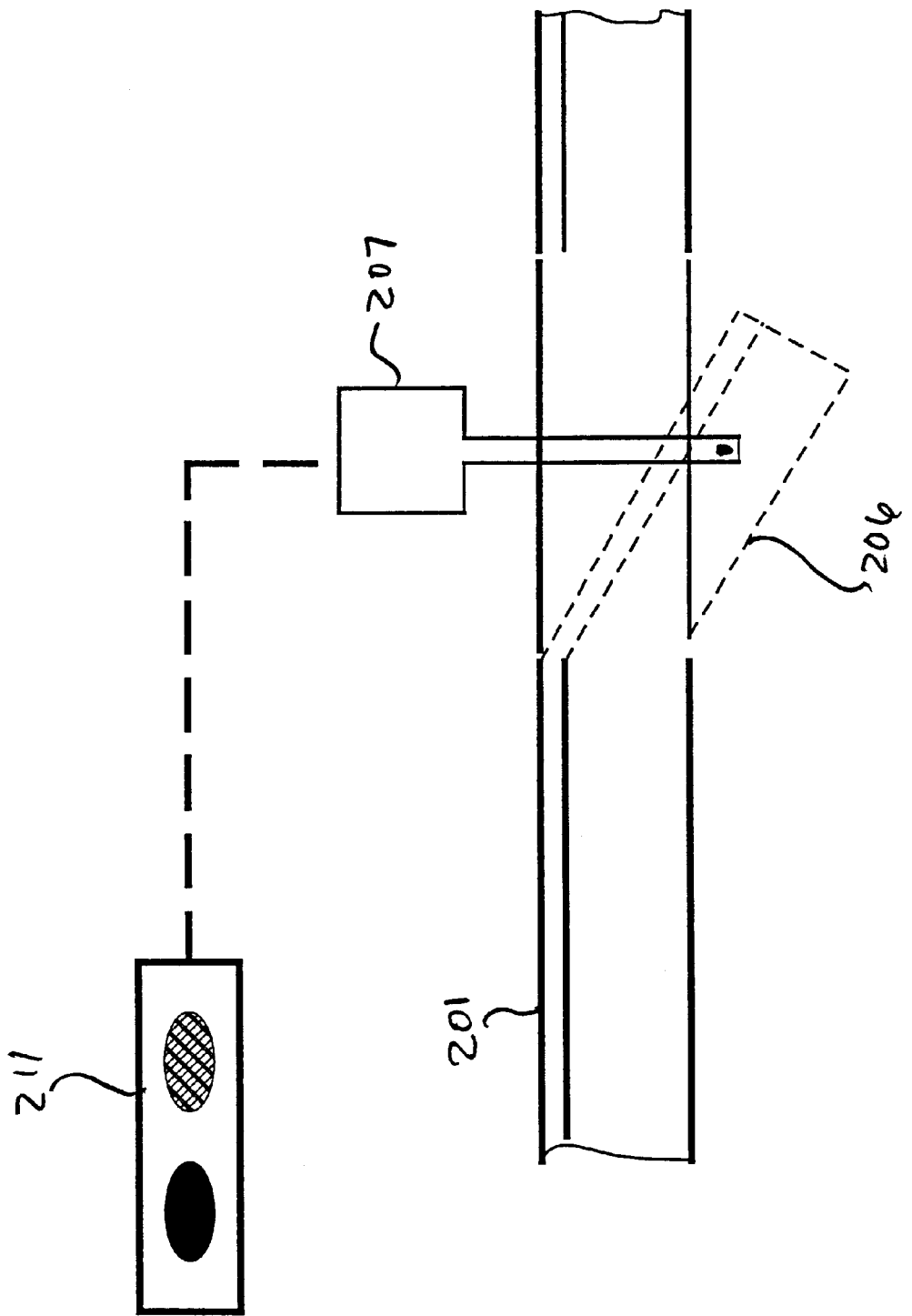
FIG. 10 is a partial view of a guide rail, including an active ramp section, for use in connection with the transverse discharge apparatus of FIG. 8.

In one embodiment, a light source 209 on the trolley or train transmits a signal received by a photocell 211 which actuates solenoid 207 to move the ramp 206 into position to engage the activation roller 204. Thus, when the trolley 22 carrying the transverse conveyor apparatus 170 approaches a location where an article conveyed by the apparatus is to be unloaded, moveable ramp 206 corresponding to the location is moved into the path of activation roller 204 by an actuator 207 (FIG. 10) such as a solenoid or pneumatic cylinder. Upon engaging an actuated moveable ramp 206, the activation roller 204 is pushed downward in the direction indicated by arrow 213 (FIG. 9), pulling sliding arm 202 in a downward direction.

As illustrated, the transverse conveyor apparatus 170 is equipped with a pair of opposed sliding arms 202 that are connected via a flexible connector 212, which as shown includes roller chains 184, corresponding to each of the sliding arms 202, and spring 200, connecting the roller chains. One end of each of the roller chains 184 is pinned to the corresponding sliding arm 202 with a pin 190 or otherwise connected to the sliding arm. The roller chains 184 associated with each of the sliding arms 202 pass over sprockets 186 mounted on shafts 210 which couple sprockets 202 to one-way clutches 188. The ends of shafts 210 are mounted in bushings (not shown) in side cover plate 180. Also mounted on each of the shafts 210 are timing belt drive pulleys 182 corresponding to each of the sliding arms 202. As shown, an end of each of the roller chains 184 is connected to spring 200 which is positioned between the timing belt drive pulleys 182. The transverse conveyor apparatus 170 includes an endless belt-type conveyor 172 that passes between and around a pair of opposed rollers 174. Each of the rollers 174 includes a sheave 176, mounted on roller shaft 175. The ends of roller shafts 175 are mounted in bushings (not shown) in side cover plate 180. Side cover plate 180 is in turn mounted on trolley 22 with cover plate brackets 208. The sheaves 176 are each coupled to a corresponding timing belt drive pulley by timing belt 178 to drive rollers 174 and transverse conveyor 172.

As will be appreciated, when one of the activation rollers 204 engages a moveable ramp 206 it pulls sliding arm 202 down which in turn pulls the associated chain 184, turning sprocket 186, shaft 210 and timing belt drive pulley 182. As chain 184 is pulled, spring 200 extends, allowing the chain 184 to turn sprocket 186 while the opposing sliding arm 202, chain 184, sprocket 186 and drive pulley 182 are held in place by the opposing activation roller 204 in guide track 201. As the timing belt drive pulley turns, timing belt 178 turns sheave 176, driving roller shaft 175, rollers 174 and conveyor 172, discharging article 28 from the trolley. When the activation roller 204 disengages moveable ramp 206, spring 200 pulls chain 184 and sliding arm 202 back into position without moving conveyor 178 since the one-way clutch 188 transmits torque in only one direction, allowing the sprocket 186 to turn back without engaging timing belt drive pulley 182. Thus, the apparatus 170 translates movement of the sliding arm 202 upon engagement of the rail into transverse movement of the conveyor 178 for discharging articles 28 carried by the apparatus without the need for a powered drive unit for the conveyor.

As will be appreciated, the passive transverse conveyor apparatus provides a reliable, flexible means of discharging articles from a trolley without the need for an onboard powered mechanism such as an electric motor and drive. Individually, or combined with the low-profile chassis previously described, with its articulating trucks, the apparatus provides a distinct improvement over prior art article carriers.

Figure 11:
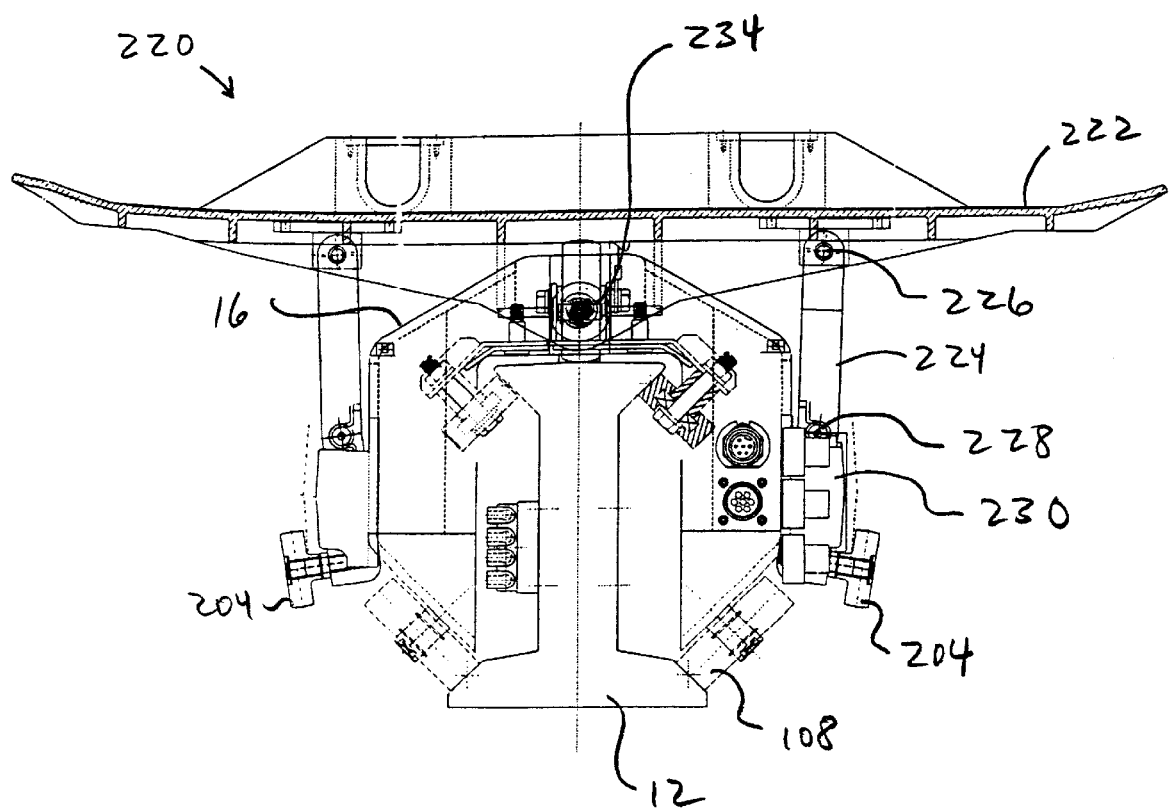
FIG. 11 is a partial cross-section view of an alternate discharge mechanism.

Referring now to FIGS. 11–13, there is illustrated an alternate passive discharge mechanism 220. Discharge mechanism 220, as illustrated comprises a externally actuated twin-arm tilt tray apparatus. Discharge mechanism 220 includes a tilting tray 222 for discharging articles to either side of track 12. A pair of opposing arms 224 are each pinned, or otherwise attached to tilting tray 222 with pins 226. Each of the arms 224 is also pinned to a rail guide wheel 204 at its lower end. The arms 224 are each provided with guide rollers 228, positioned in side guides 230 for maintaining the vertical alignment of the arms. A pivot pin, 234 secures the tilt tray to chassis 16.

The passive discharge apparatus 220 of FIG. 11 is also used with a guide rail 201 (FIG. 10) having moveable ramps 206. Thus, when one of the activation rollers 204 of apparatus 220 engages a moveable ramp 206 it pulls down on tilting tray 222, causing the tray to pivot around pivot mount 232 (FIG. 12). In the case of passive discharge mechanism 220, unlike the discharge mechanism described in connection with FIGS. 8 and 9, the section of the guide rail opposite the moveable ramp must allow the activation roller 204 opposite the roller engaging the moveable ramp 206 to move vertically. This may be accomplished by utilizing a cut-out in the top section of the guide rail or by providing a gap in the guide rail opposite moveable ramps 206.

While the invention has been described in reference to illustrative embodiments, this description is not intended to be construed in a limiting sense. Various rearrangements of parts, modifications and combinations of the illustrative embodiments, as well as other embodiments of the invention, will be apparent to persons skilled in the art upon reference to the description.

What is claimed:

1. An apparatus adapted for mounting on a trolley for transporting articles along the path of a track, the apparatus being adapted to discharge articles at selected locations, comprising:

a non-tilting conveyor, mounted for movement in a direction transverse to the track;

an arm coupled to the conveyor for engaging a member positioned adjacent to the track; and a connector for coupling the arm to the conveyor, the connector translating movement of the arm upon engagement of the member into transverse movement of the conveyor for discharging articles carried by the apparatus without the need for a powered drive unit for the conveyor.

2. The apparatus of claim 1 wherein the connector comprises a flexible inelastic element coupled to a flexible elastic element.

3. The apparatus of claim 1 wherein the connector comprises a chain connected to a spring.

4. The apparatus of claim 1 wherein the connector actuates the conveyor through a clutch coupled to the conveyor.

5. The apparatus of claim 1 further comprising a truck for supporting the trolley on a rail structure including a carriage;

a yoke connected to the carriage by a rotatable support, such that the yoke can rotate in a horizontal plane relative to the carriage;

a plurality of guide wheels; and non-swiveling fixtures that mount each wheel to the yoke at horizontally offset positions with predetermined spacing to conform to the rail structure, such that rotation of the yoke relative to the carriage causes the wheels to move in unison to conform to a curve in the rail structure.

6. The truck of claim 5, further comprising a pair of yokes having associated wheels and non-swiveling fixtures mounted at front and rear portions of the carriage.

7. The truck of claim 5 further comprising a plurality of couplers extending through each yoke.

8. The truck of claim 7 wherein the carriage further comprises a support plate including a plurality of apertures for receiving the couplers.

9. The truck of claim 8 wherein the couplers loosely couple the yokes and carriage for rotation of the yoke relative to the carriage around a vertical axis.

10. An article conveying trolley comprising:

a passive discharge mechanism;

a carriage adapted to travel along an I shaped rail, the carriage being connected to the discharge mechanism;

a yoke connected to the carriage by a rotatable support, such that the yoke can rotate in a horizontal plane relative to the carriage;

at least one load bearing wheel supporting the carriage, the load bearing wheel contacting an upper bearing surface of the I shaped rail;

a plurality of guide wheels; and non-swiveling fixtures that mount each wheel to the yoke at horizontally offset positions with predetermined spacing to conform to the rail structure, such that rotation of the yoke relative to the carriage causes the wheels to move in unison to conform to a curve in the rail structure.

11. The article conveying trolley of claim 10 further comprising an onboard microprocessor for signaling a remote device to actuate an engaging member for engaging the passive discharge device to discharge an article from the trolley at a selected location.

12. The article conveying trolley of claim 11 wherein the onboard microprocessor receives and stores information regarding the destination of an article being transported by the trolley.

13. The article conveying trolley of claim 10 wherein the passive discharge mechanism comprises a conveyor, mounted for movement in a direction transverse to the track.

14. The article conveying trolley of claim 13 further comprising a flexible connector including a flexible inelastic element coupled to a flexible elastic element, the flexible connector actuating the conveyor through a clutch coupled to the conveyor.

15. The article conveying trolley of claim 14 wherein the flexible connector comprises a chain connected to a spring.

16. The article conveying trolley of claim 10 wherein the passive discharge mechanism comprises a twin arm tilt tray.

17. An article handling system comprising:

an I shaped monorail track having an uppermost bearing surface;

a trolley adapted to travel along an arcuate path defined by the track including a rigid frame having a longitudinal axis and opposed ends;

at least two axles, each mounted adjacent to an opposing end of the rigid frame, the axles being mounted for rotational movement around an axis perpendicular to the longitudinal axis as the trolley travels along an arcuate path, a load bearing wheel mounted on each of the axles, at least one if the load bearing wheels being positioned to contact the uppermost bearing surface of the I shaped monorail; and a passive article conveying and discharge apparatus mounted on the rigid frame.

18. The article handling system of claim 17 further comprising a monorail track, the trolley being adapted to travel along an arcuate path defined by the track and at least one unloading station positioned adjacent to the track.

19. The article handling system of claim 17 where in an onboard microprocessor for signals a remote device to actuate an engaging member for engaging the passive discharge device to discharge an article from the trolley at a selected location.

20. The article conveying trolley of claim 17 wherein the onboard microprocessor receives and stores information regarding the destination of an article being transported by the trolley.

21. The article conveying trolley of claim 17 wherein the passive discharge mechanism comprises a conveyor, mounted for movement in a direction transverse to the track.

22. The article conveying trolley of claim 10 further comprising a flexible connector including a flexible inelastic element coupled to a flexible elastic element, the flexible connector actuating the conveyor through a clutch coupled to the conveyor.

23. The article conveying trolley of claim 17 wherein the passive discharge mechanism comprises a twin arm tilt tray.

24. An apparatus adapted for mounting on a trolley for transporting articles along the path of a track, the apparatus being adapted to discharge articles at selected locations, comprising:

a non-tilting conveyor, mounted for movement in a direction transverse to the track;

an arm coupled to the conveyor for engaging a member positioned adjacent to the track; and a connector for coupling the arm to the conveyor, the connector translating movement of the arm upon engagement of the member into transverse movement of the conveyor for discharging articles carried by the apparatus without the need for a powered drive unit for the conveyor, the connector comprising a flexible elastic element.

25. The apparatus of claim 24 wherein the connector further comprises a flexible inelastic element.

26. The apparatus of claim 25 wherein the flexible inelastic element comprises a chain.

27. The apparatus of claim 24 wherein the flexible elastic element comprises a spring.

28. The apparatus of claim 24 wherein the conveyor comprises a belt type conveyor.

29. The apparatus of claim 24 wherein the connector actuates the conveyor through a clutch coupled to the conveyor.

30. An apparatus adapted for mounting on a trolley for transporting articles along the path of a track, the apparatus being adapted to discharge articles at selected locations, comprising:

a belt type conveyor mounted for movement in a direction transverse to the track;

an arm coupled to the conveyor for engaging a member positioned adjacent to the track; and a connector for coupling the arm to the belt, the connector translating movement of the arm upon engagement of the member into transverse movement of the conveyor for discharging articles carried by the apparatus without the need for a powered drive unit for the conveyor.

31. The apparatus of claim 30 wherein the connector comprises a flexible elastic element.

32. The apparatus of claim 31 wherein the connector further comprises a flexible inelastic element.

33. The apparatus of claim 32 wherein the flexible inelastic element comprises a chain.

34. The apparatus of claim 31 wherein the flexible elastic element comprises a spring.

35. The apparatus of claim 30 wherein the connector actuates the conveyor belt through a clutch coupled to the conveyor.

\* \* \* \* \*